July 20, 1937.
C. GEISSEN
2,087,377
HIGH SPEED TRAIN
Filed April 6, 1935
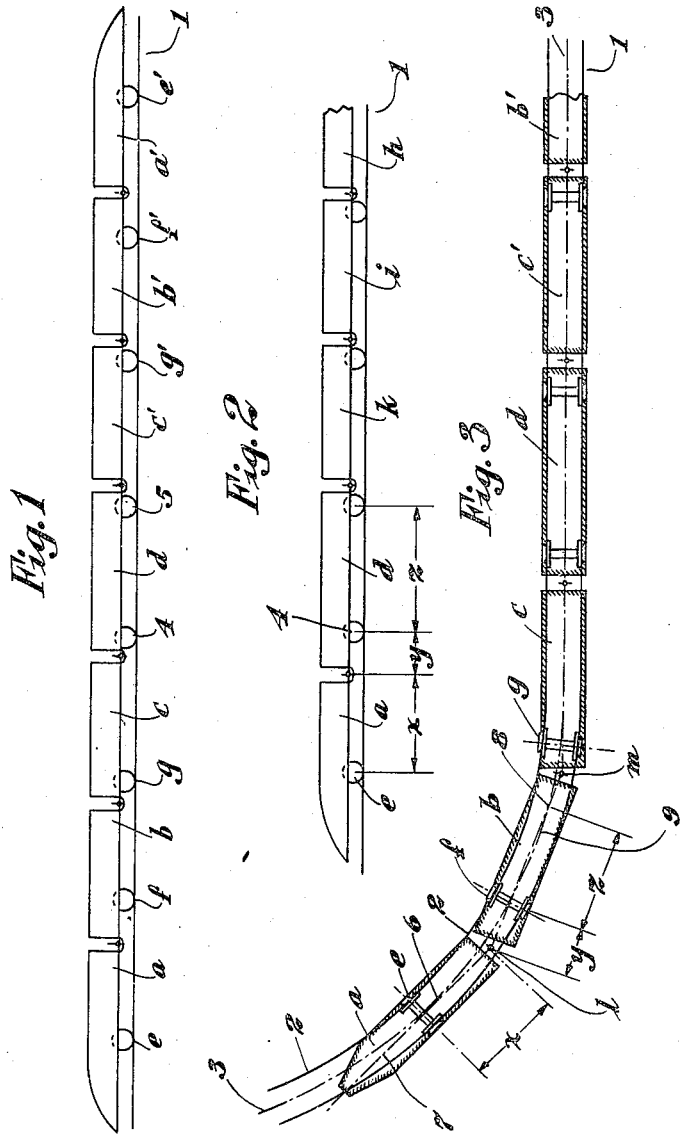
INVENTOR,
Carl Geissen,
BY
Bartlett Eyre Scott O'Keel
ATTORNEYS.

Patented July 20, 1937

2,087,377

UNITED STATES PATENT OFFICE 2,087,377

HIGH SPEED TRAIN

Carl Geissen, Berlin, Germany

Application April 6, 1935, Serial No. 14,982
In Germany January 27, 1932

9 Claims. (Cl. 105—3)

This invention relates to high speed, light weight trains and particularly to trains composed of train elements or sections connected together by two-axle coupling cars, with the other cars having only one axle each, which is disposed at or towards the end remote from the coupling car.

One object of the invention is a train of this generally indicated character wherein the required length and cubic capacity of the cars are rendered possible with safe and smooth operation at the high speeds notwithstanding the light construction and high speed.

A further object of the invention is a train of this generally indicated character wherein the leading car is provided with a rigid non-pivoting and non-controllable axle, with provision for ample axle loading and a permissible striking angle between the wheel flange and the rail on uniform curves.

According to one aspect of the invention the axle of the single-axle car that adjoins the leading car, or the nearest of the axles if a coupling car adjoins the leading car, is displaced backwardly from the coupling so that in traveling over a uniform curve the center point of the coupling is displaced outside the center line of the track to such an amount that, notwithstanding the ample distance from the leading car's axle to the coupling, this axle may be controlled from the tangential incidence of the flange against the rail, with a striking angle that is still permissible. In place of the tangential incidence, without a striking angle that is, a small striking angle is chosen because that enables the axle and coupling to be spaced as far apart as possible, which is of prime importance for smooth running of the leading car.

Further objects of the invention will hereinafter appear and for a better understanding of the invention reference may be had to the accompanying drawing wherein:

Fig. 1 is a diagrammatic side view of a train embodying the invention;

Fig. 2 shows a modified arrangement;

Fig. 3 is a plan diagrammatic view corresponding to Fig. 1.

Referring to the drawing, the train embodying the invention is disposed on track 1 having a uniform curve 2 and the center line of the track is indicated at 3.

In Figs. 1 and 3 the leading or end cars $a$, $a'$ are provided with wheels having rigid axles $e$, $e'$ with a two axle coupling car $d$ in the middle or displaced from the end cars. In Fig. 2 the two axle coupling car $d$ directly follows the leading or end car $a$. In both modifications the rigid axles $e$ or $e'$ are not disposed adjacent the outer ends of the cars $a$, $a'$, but are displaced toward the coupling car $d$, as shown. In Figs. 1 and 3 the axles $f$, $f'$ of the cars $b$, $b'$ that adjoin the end cars $a$, $a'$ respectively are displaced from the end of the car in the same direction as the axles $e$, $e'$ are displaced. In the modification of Fig. 2 wherein the coupling car $d$ is coupled directly to the leading car $a$ then the axle 4 of the coupling car that is adjacent the end car $a$ is displaced toward the center of the coupling car as shown.

The intermediate cars in Figs. 1 and 3 are indicated at $b$, $c$ and $b'$, $c'$, and in Fig. 2 at $k$, $i$, $h$.

Referring to Fig. 3, although axle $e$ of end car $a$ is positioned ahead of the contact point 6 of the car center-line 7 with the center line 3 of the curved track, the arrangement nevertheless allows of a permissible striking angle of the flange. The supporting couplings $l$ and $m$ between the cars $a$, $b$ and $c$, in traveling round the curved track, are observed to be displaced from the track center line 3, and for this reason car axles $f$, $g$, etc. are mounted and disposed pivotally with the car length as is shown, in order to avoid too large a striking angle. $x$, $y$ and $z$ are distances that should have a certain ratio to one another. Good results are obtained when $x$, $y$ and $z$ are approximately as $3\frac{1}{2}:1:5$. A satisfactory uniform loading of the axles, and especially of the end car axles, is obtained by the specified selection of axles for the individual cars and their disposition upon the cars. The displacement of the axles $f$, $f'$ away from the end cars or such displacement of the axle 4 of Fig. 2 of the two axle car directly coupled to an end car, as described above, results in a spacing distance $y$ between the axle of the second car and the supporting coupling for the end car which is greater than the spacing distance between the axles and the corresponding couplings of the rest of the adjustable axle cars, that is, greater than the spacing distance or distances between the supporting couplings of adjustable axle cars and the axles of adjacent cars such as the distances from $g$ to $m$, $g'$ to the adjacent coupling, 5 to the adjacent coupling, etc.

The following relationships should exist for best results: Let $x$ indicate the distance of axle $e$ of end car $a$ from coupling point $l$ of the articulated coupling with the next car $b$, let $y$ indicate the distance of the moved-back axle $f$ or 4 of the next car $b$ from the same coupling point, and finally let $z$ indicate the axle spacing of the two-axle coupling car $d$ that adjoins the end car or else the imaginary axle spacing from the center of the existent car axle to the other intersection 8 of the longitudinal center line 9 of the car with the track center line in a uniform curve; then $x$ may be made the larger, the farther the coupling point of the articulated coupling moves out from the center line of the track in the curve. Now this amount of displacement of the coupling from the track center line becomes the larger, the larger dimension $y$ is made with dimension $z$ constant, or the larger dimension $z$ is made with the dimension $y$ constant. For any uniform radius of curvature a ratio of $x:y:z$ approximately equal to $3\frac{1}{2}:1:5$ is most suitable, because this ratio gives a suitable axle-spacing $z$ for smooth running of the cars, and for the same reasons it gives a suitable distance $x$, without its having to be obtained at the expense of an unduly large increase in the overhang indicated by the spacing $y$, which would cause rough running.

The above-mentioned ratios are obtained from the fact that the theoretical value of $x$ with which the flange of the end car would run exactly tangential to the rail, has, on account of the necessary length of cars of light construction, to be increased by an amount that still keeps the striking angle a permissible one. This increment may be made substantial without having to fear an impermissible spear-flight movement (i. e. outside leading wheel rubbing against the rail while the trailers follow the curve) with a fixed axle-spacing, and preferably the theoretical value of $x$ is increased by at least 38% to obtain the desired spacing. Now if we make the wheel spacing 12 metres, as being suitable for a long car, and make the car overhang 2.4 metres, as being suitable for a car of usual width, then we will get a theoretical $x$ of 5.88 metres, which may be increased by more than 2.25 metres (and even more than 5 metres in some cases), say by about 2.52 metres in the present case. This gives the proportions $x:y:z=8.4:2.4:12=3\frac{1}{2}:1:5$. This ratio may vary somewhat, according to the choice of the allowable increment to $x$, and to the choice of a suitable car overhang for the greatest wheel-spacing that is selected for car $d$. The best values will however always approximate this ratio. For if $z$ is 15 metres; $y$, 3 metres; and an increment of 3.15 metres is added to the theoretical value of 7.35 metres for $x$; then the ratio 10.5:3:15 comes out at $3\frac{1}{2}:1:5$; whereas if the increment to $x$ were 2.25 metres, the ratio would be 9.6:3:15, which equals 3.2:1:5, and which as an approximate value still falls within the scope of what has been given.

If good performance during operation is to be attained when light construction is used, the values of $x$, $y$ and $z$ must be chosen carefully. In order to obtain sufficient axle load, light construction requires as large a value as possible for $z$. This establishes $y$, given a certain allowable car width and taking the gauge of the railroad into consideration, from which the theoretical value for $x$ is obtained. The increment to this $x$, for the purpose of loading the rigid axle of the end car, has then to be made large, yet it must be kept within such limits that excessive spear-flight movement of the end car is avoided. The above-mentioned ratio for $x$, $y$ and $z$ should therefore be always approximately obtained for the best construction that is possible. With a sufficiently large $z$, the axle or the axles of the second car must be pivotable about their centers and adjustable, which may be suitably and positively effected through the angular setting of the car that belongs to the axle relatively to the axle of the adjoining car. Any suitable positive steering means for the adjustable axles may be employed.

The train construction above set forth employing the fixed or non-adjustable axle on the leading or end cars is a distinct improvement over trains of this general character providing with either a truck or a so-called Association leading axle (flexible axle as approved by the German Railway Association). It is difficult, when using a truck, to load its axles sufficiently, especially with cars of light construction, because attempts along these lines have called for a car of such length that, taking the negotiation of curves into account, it would have had to be of undue narrowness. This drawback may be partially avoided with an Association leading axle, which could be used instead of a truck. With light construction, indeed, cars could also be used which, while having sufficient length or while having a greater distance of axle from their coupling to the adjoining car, could be made sufficiently wide; however, according to experience, the Association leading axles, on account of their uneven running, can only be used on trains that do not travel very fast. With the leading car, moreover, it is not possible to replace the Association leading axle by a positively controlled axle, because no occurrence of motion is available at this point from which the axle could be controlled.

With the construction set forth herein these disadvantages are obviated. The axle loading is ample, the striking angle between the flange and the rail is maintained within limits, the cars may be as long as is desired and of the required cubic capacity and the train may run smoothly notwithstanding the high speed and light weight construction.

I claim:

1. A railway train comprising an end car having a single non-adjustable axle and a plurality of other cars having adjustable axles, one of said other cars being a two-axle coupling car and the others single axle cars, the axles of the latter being disposed toward the ends of the cars remote from the coupling car, couplings between the cars forming supports for the other ends of these single axle cars and for the end of the end car toward the coupling car, the axle of said end car being spaced from the end car supporting coupling a distance greater than the distance from said coupling to the contact point between the car centerline and the rail curve arc centerline of the track on a uniform curve, said spacing distance of the end car axle from the supporting coupling being less than that which would cause the striking angle between the flange of the outer wheel of the end car axle and rail to reach a dangerous value and the distance between the axle of the one of said other cars directly coupled to the end car and the coupling support for the end car being greater than that between the axles and the corresponding couplings of the rest of the adjustable axle cars.

2. In a railway train of the character set forth in claim 1 wherein at least one adjustable single axle car is disposed between said end car and the two axle coupling car.

3. In a railway train of the character set forth in claim 1 wherein the two axle coupling car is coupled at one end directly to said end car.

4. In a train of the character set forth in claim 1 wherein the spacing distance between the non-adjustable axle and the supporting coupling between the end car and the adjacent car, the spacing distance from said coupling to the axle of said adjacent car, and the axle spacing distance of the latter car are approximately in the ratio of 3½:1:5.

5. In a railroad train, an end car having a single non-adjustable axle, a second car having two adjustable axles and a coupling between said cars, with the spacing distance between the non-adjustable axle of the end car and the coupling, the spacing distance from the coupling to the nearest axle of the second car, and the axle spacing distance of the second car being approximately in a ratio of 3½:1:5.

6. In a railway train, a two-axle car, a plurality of single-axle cars coupled together by said two-axle car including an end car having a non-adjustable axle, and at least one intermediate single axle car between the two-axle car and the end car, a supporting coupling between the end car and said intermediate single axle car, the spacing distance between the non-adjustable axle of the end car and the supporting coupling, the spacing distance from the supporting coupling to the axle of the intermediate adjacent single axle car, and the theoretical axle spacing of the intermediate single axle car being approximately in the ratio of 3½:1:5.

7. In a railway train, an end car having a single non-adjustable axle, a two-axle car and a single axle car having adjustable axles, a coupling between the two axle car and the end car, a second coupling between the two-axle car and the single axle car having the adjustable axle, the spacing distance between the non-adjustable axle of the end car and the first named coupling, the spacing from the latter to the adjacent axle of the two-axle car and the axle spacing of the two-axle car being approximately in the ratio 3½:1:5, while the adjustable axle of the single axle car is disposed near the end of the said single-axle car which is remote from the two-axle car.

8. In a train of the character set forth in claim 1 wherein the axle of said end car is spaced from the supporting coupling of said end car a distance which is 38% greater than the distance from the point of contact between the center line of the car and the center line of the rail curve arc to said end car coupling on a uniform curve with the flanges of the wheels of the end car disposed tangentially to the rail.

9. In a railroad train, an end car having a single non-adjustable axle, an intermediate car coupled directly to said end car and having a single adjustable axle, a car having two adjustable axles, said single adjustable axle being displaced away from the end car coupling a distance greater than the distance from the coupling of the two axle car to the adjacent axle thereof, couplings for said cars including supporting couplings for the single axle cars, the spacing distance between the non-adjustable axle of the end car and the supporting coupling, the spacing distance from the supporting coupling to the axle of the intermediate adjacent single axle car, and the theoretical axle spacing of the intermediate single axle car being approximately in the ratio of 3½:1:5.

CARL GEISSEN.